United States Patent [19]

Hanson et al.

[11] Patent Number: 5,415,586

[45] Date of Patent: May 16, 1995

[54] COMBINE HARVESTER LEVELING SYSTEM, COMBINE HARVESTER HEADER ADJUSTING SYSTEM, AND PIVOTING CHAIN DRIVE SYSTEM

[75] Inventors: Raymond A. Hanson, Liberty Lake; Robert L. Bird; Kenneth A. Pfaff, both of Spokane, all of Wash.

[73] Assignee: R. A. Hanson Company, Inc., Spokane, Wash.

[21] Appl. No.: 153,379

[22] Filed: Nov. 17, 1993

[51] Int. Cl.$^6$ ............ A01D 75/28; A01F 12/00
[52] U.S. Cl. .................... 460/8; 56/209; 56/DIG. 10; 56/10.2 E; 180/41; 280/6.12
[58] Field of Search .............. 460/8, 9, 119, 150, 460/901; 56/209, DIG. 5, DIG. 15, DIG. 10, 10.2 E; 180/41; 280/6.11, 6.12

[56] References Cited

U.S. PATENT DOCUMENTS

| | | | |
|---|---|---|---|
| 2,656,668 | 10/1953 | Witzel | 56/209 |
| 2,709,329 | 5/1955 | Neal | 56/209 |
| 2,753,675 | 7/1956 | Harp | 56/209 |
| 2,780,903 | 2/1957 | Kroll et al. | 56/209 |
| 2,821,059 | 1/1958 | Heitshu | 56/209 |
| 2,871,646 | 2/1959 | Heitshu et al. | 56/209 |
| 2,904,949 | 9/1959 | Bell | 56/209 |
| 2,947,134 | 8/1960 | Clifford et al. | 56/209 |
| 3,065,590 | 11/1962 | Knollman | 56/209 |
| 3,675,404 | 7/1972 | Izakson | 56/209 |
| 3,731,470 | 5/1973 | Cornish et al. | 280/6.12 X |
| 4,696,152 | 9/1987 | Kinzenbaw | 460/8 X |
| 4,733,523 | 3/1988 | Dedeyne et al. | 56/209 |
| 4,750,751 | 6/1988 | Schafer | 280/6.12 |

FOREIGN PATENT DOCUMENTS 590616 12/1960 Canada .

*Primary Examiner*—Terry Lee Melius
*Attorney, Agent, or Firm*—Wells, St. John, Roberts, Gregory & Matkin

[57] ABSTRACT

A header adjusting system for a hillside combine harvester includes a master hydraulic cylinder assembly and a slave hydraulic cylinder assembly. The master hydraulic cylinder assembly is slaved to movement of the wheels relative to the combine frame. The slave hydraulic cylinder assembly is slaved to extension and retraction of the master hydraulic cylinder assembly. The slave hydraulic cylinder assembly causes the header to pivot about the longitudinal axis of the harvester in order to follow the contour of the ground. A header trimming mechanism is also provided to enable direct operator control of some of the pivoting action of the header about the longitudinal axis. A leveling system for a hillside combine harvester includes a cable and a biased, moveable reference pulley associated therewith. Movement of the reference pulley actuates a switch which selectively imparts fluid flow to hydraulic leveling cylinders to re-establish a reference position of such pulley, and correspondingly a reference orientation of such cylinders. A chain drive system for a hillside combine or other vehicle includes a first arm and second arm, at least one of which is mounted for pivotal movement relative to the other. An interconnecting chain drive sprocket assembly is independently rotatably supported relative to the pivot connection between the first and second arms. Such assembly includes interconnected chain drive sprockets for transferring chain drive from one arm to the other through the pivot connection.

41 Claims, 10 Drawing Sheets

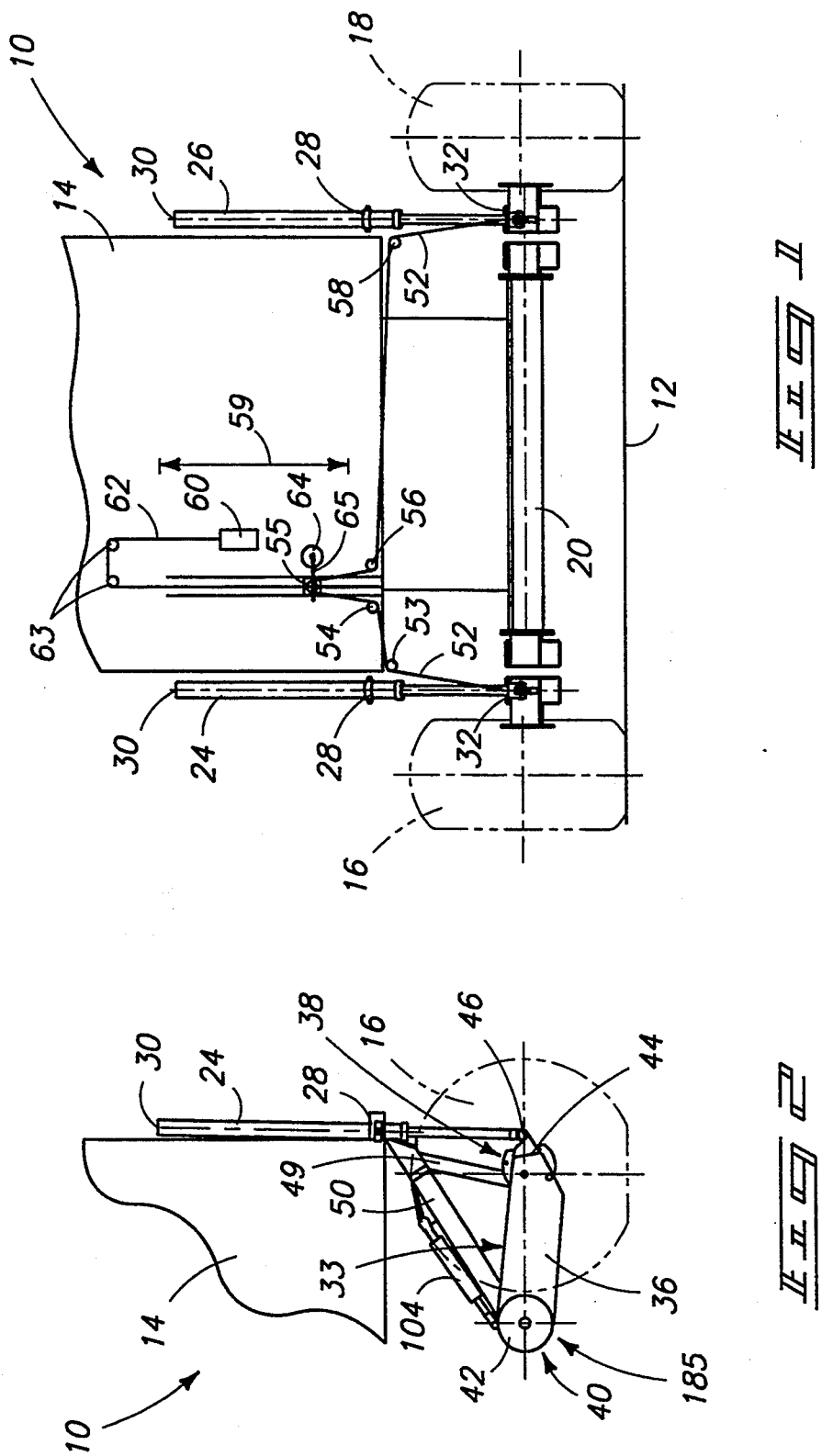

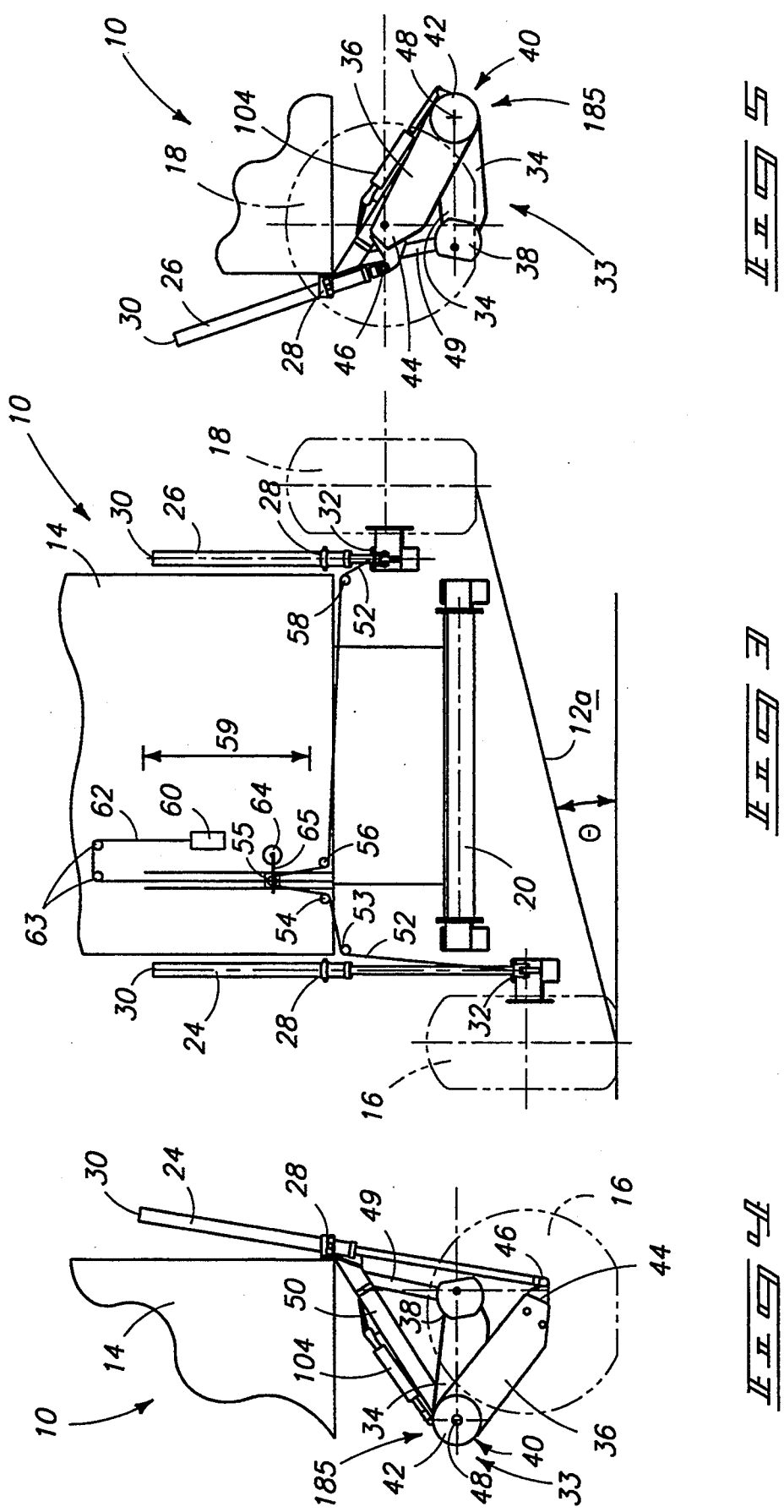

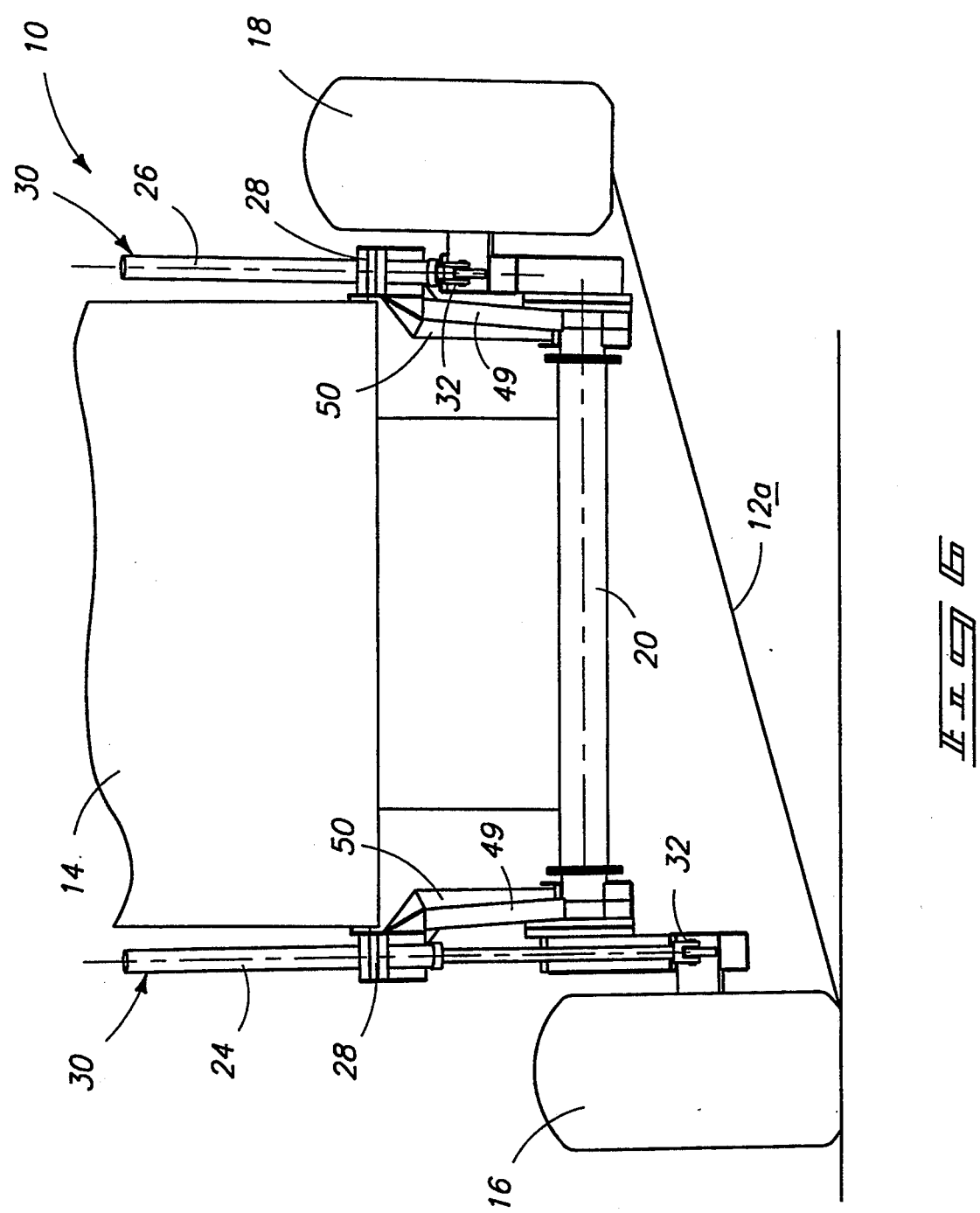

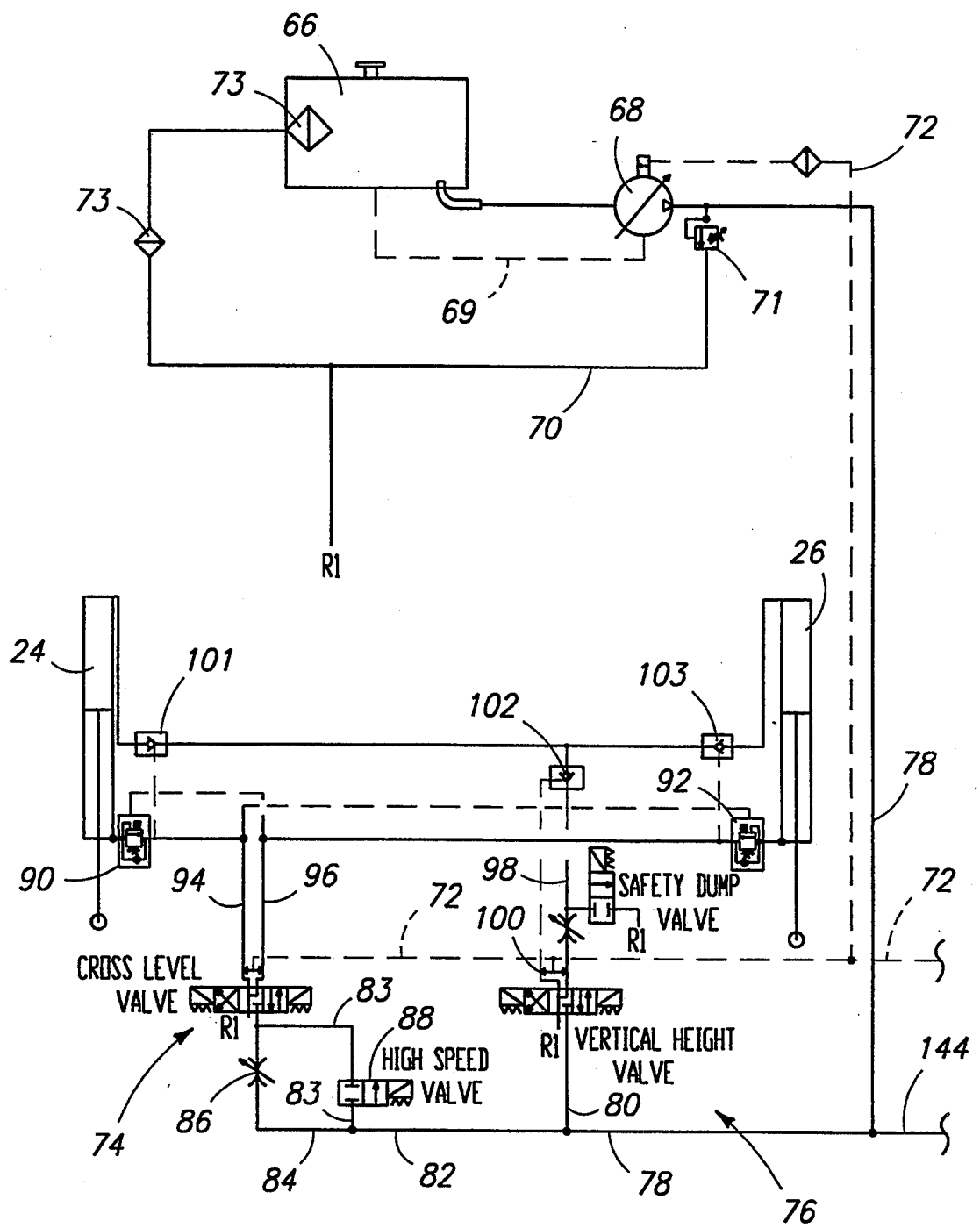

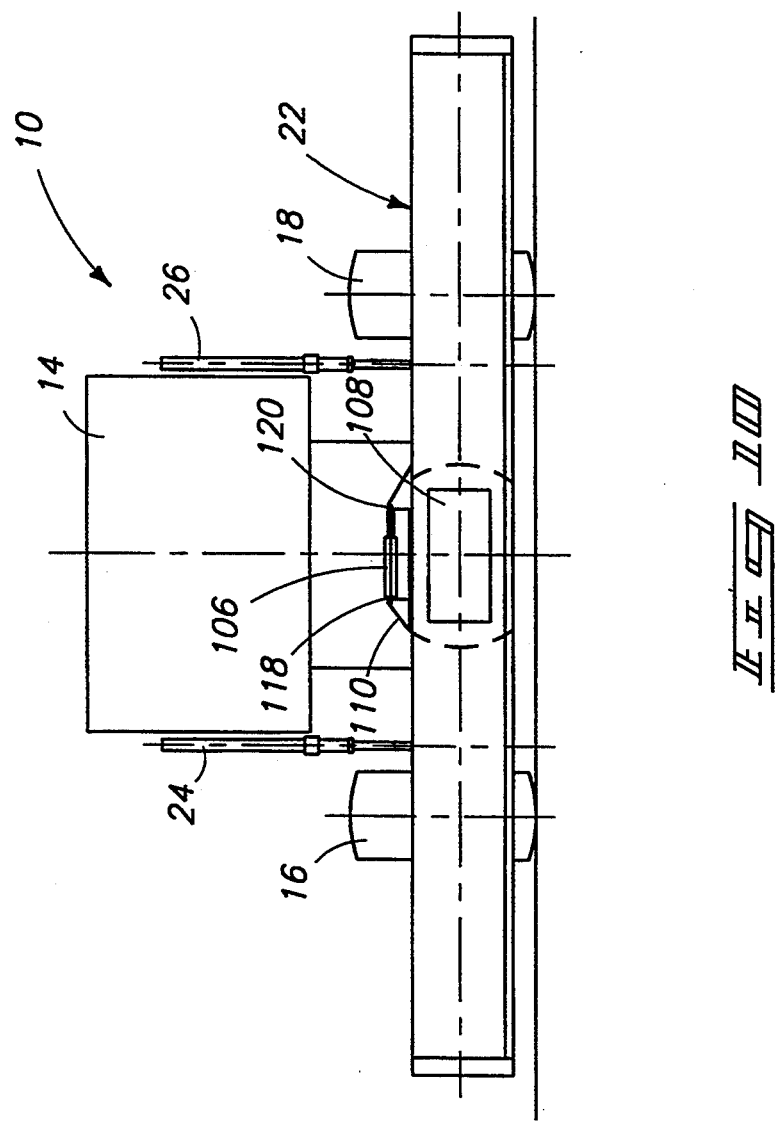

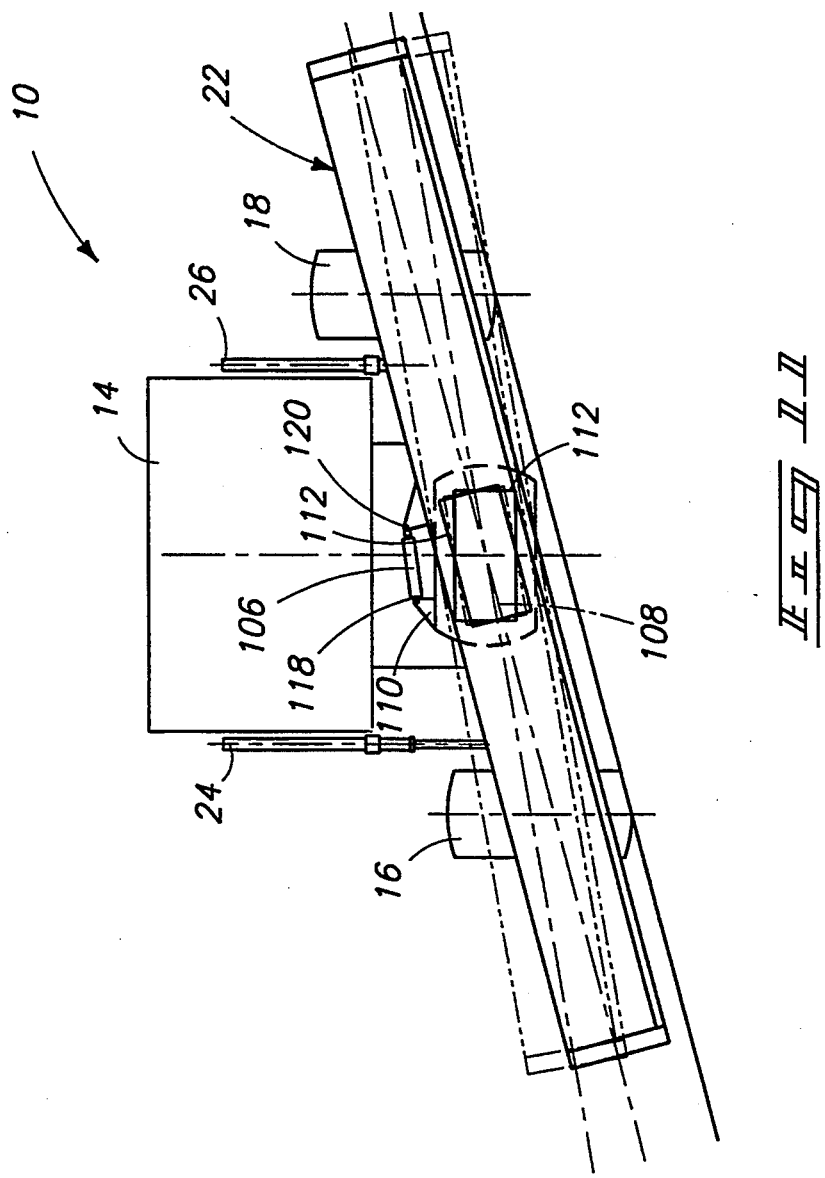

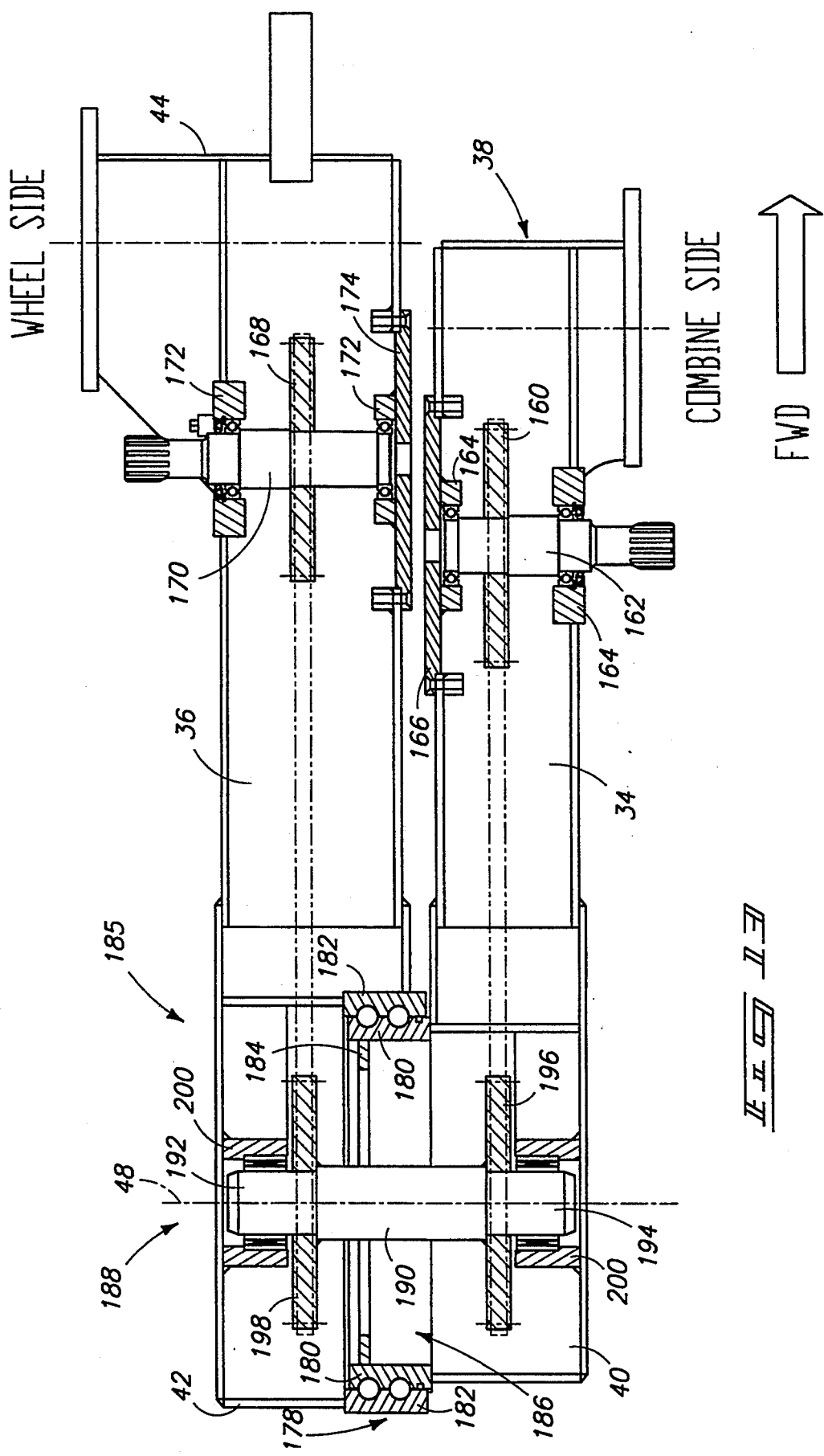

5,415,586

COMBINE HARVESTER LEVELING SYSTEM, COMBINE HARVESTER HEADER ADJUSTING SYSTEM, AND PIVOTING CHAIN DRIVE SYSTEM

TECHNICAL FIELD

This invention relates to combine harvester leveling systems for hillside combines, to combine harvester header adjusting systems for hillside combines, and to chain drive systems.

BACKGROUND OF THE INVENTION

A typical combine harvester includes a fore crop cutting mechanism referred to as a header, and a threshing mechanism to which the cut crop is elevated from the header. In many parts of the United States, particularly the Northwestern area, harvesting of grain occurs in hilly and mountainous areas. Such has led to the development of what are commonly referred to as hillside combines.

When harvesting crops from hillsides, it is desirable that the header follow the contour of the field surface. Yet, the threshing and cleaning mechanisms operate better if they preserve a horizontal orientation. That is, it is desirable that the main combine body be prevented from substantial tipping on a longitudinal axis, although a reasonable amount of tipping about a transverse axis is not a serious disadvantage. It is also desirable that the operator cab also be aligned with the threshing mechanism for operator comfort and safety. Hillside combines provide such features.

Hillside leveling combines are typically constructed to be self-leveling about their longitudinal axis. One example system includes a mercury level switch on the main frame which is activated when the starts to transversely tilting as the combine travels on the side of a hill. As such tilting occurs, the mercury switch activates a leveling mechanism to cause the downhill transverse side sets of wheels to move downwardly, and the opposing uphill transverse sets of wheels to move upwardly a corresponding amount. Thus, the cab and threshing mechanisms are maintained level within the degree of leveling capability of the overall apparatus. The combine header is mounted to be pivotal relative to the main frame. The header and wheels are typically interconnected in such a manner that the angle of the header relative to the main frame is compelled to follow that of the wheels. The typical mechanisms by which this occurs includes cables and pulleys interconnecting the wheel angling system relative to the header.

In such combines, of course, the header is positioned forward of the forwardmost pair of transverse wheels. Accordingly, the header reaches a changing slope condition in advance of the wheels reaching that condition. Until such time as the wheel pass the changing slope, the header does not follow the changing contour of the hillside.

BRIEF DESCRIPTION OF THE DRAWINGS

Preferred embodiments of the invention are described below with reference to the following accompanying drawings.

FIG. 1 is a front diagrammatic depiction of a combine leveling system shown in one operational configuration in accordance with the invention.

FIG. 3 is a front diagrammatic depiction of the FIG. 1 combine leveling system shown in another operational configuration in accordance with the invention.

FIG. 4 is a left side elevational view of the FIG. 2 diagram.

FIG. 5 is a right side elevational view of the FIG. 2 diagram.

FIG. 6 is an enlarged front diagrammatic depiction of the FIGS. and 2 leveling system, shown in the FIG. 2 operational configuration, but depicting additional structural components not shown in FIGS. 1 and 2 for clarity in FIGS. 1 and 2. Certain components shown in FIGS. 1 and 2 are not shown in FIG. 6 for clarity in FIG. 6.

FIG. 7 is an enlargement of portions of FIG. 5.

FIG. 9 is a schematic of the hydraulics of a levelling system in accordance with the invention.

FIG. 10 is a front diagrammatic depiction of a combine with a fore header emphasizing a header adjusting system, and shown in one operational configuration, in accordance with the invention.

FIG. 11 is a front diagrammatic depiction of FIG. 10, but shown in alternate operational configurations.

FIG. 13 is an enlarged cross sectional view of a pivoting chain drive system for a combine as shown in FIG. 2.

DETAILED DESCRIPTION OF THE PREFERRED EMBODIMENTS

Figure 2:
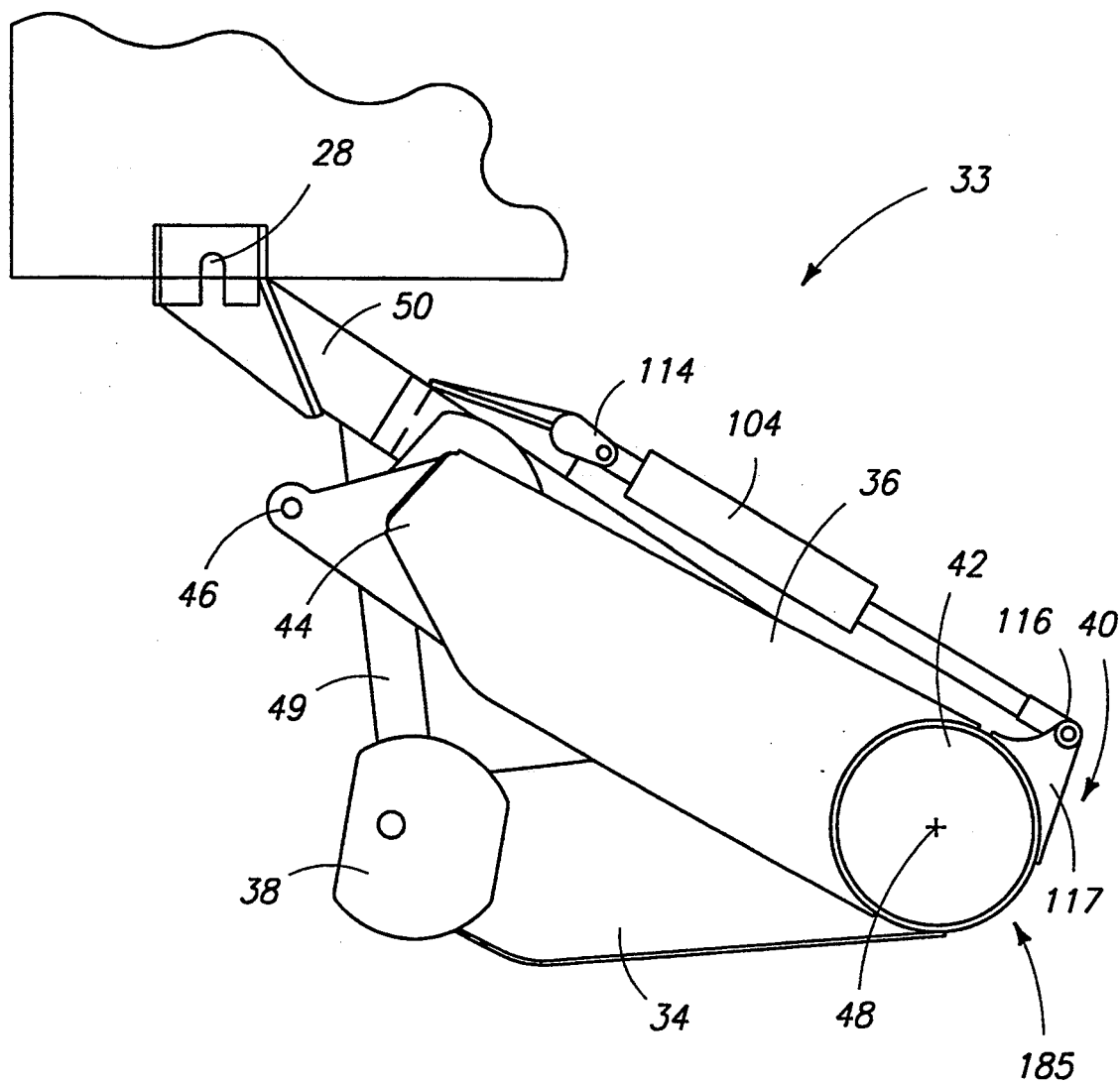
FIG. 2 is a left side elevational view of the FIG. 1 diagram.

This disclosure of the invention is submitted in furtherance of the constitutional purposes of the U.S. Patent Laws "to promote the progress of science and useful arts" (Article 1, Section 8).

The invention comprises a combine harvester header adjusting system, a combine harvester leveling system, and a vehicle chain drive system. Such are preferably cooperatively combined in a single combine harvester, although such would be independently usable without the others. The invention is only intended to be limited by the accompanying claims, appropriately interpreted in accordance with the Doctrine of Equivalents.

The header adjusting system aspect of the invention comprises:

a master hydraulic cylinder assembly having opposing ends, one of the master opposing ends being operatively connected relative to the main combine frame, the other of the master opposing ends being operatively connected relative to at least one of the elevationally movable opposing rotatable members to cause extension of the master cylinder assembly upon one of raising or lowering of the one rotatable member relative to the main frame and to cause retraction of the master cylinder assembly upon the other of raising or lowering of the one rotatable member relative to the main frame, the master cylinder assembly being slaved to such extension and retraction movement as directed by the leveling means, the master cylinder assembly being extendable and retractable between opposing master extreme positions;

a slave hydraulic cylinder assembly having opposing ends, one of the slave opposing ends being operatively connected relative to the main combine frame, the other of the slave opposing ends being operatively connected relative to the header to cause pivoting of the header about the generally fore-and-aft axis of the harvester, the slave cylinder assembly being extendable and retractable between opposing slave extreme positions;

a pair of hydraulic lines connecting selected respective ends of the master and slave cylinder assemblies to impart synchronized slaved extension or retraction of the slave cylinder assembly upon corresponding extension or retraction of the master cylinder assembly as directed by the leveling means thus hydraulically imparting synchronized pivoting of the header upon corresponding raising or lowering of the one rotatable member, the slave cylinder assembly having a hydraulic length which provides the slave extreme positions beyond positions which are reachable by master cylinder assembly extreme extension and extreme retraction alone; and control means for, a) providing more hydraulic fluid to a selected one side of the slave cylinder assembly than is provided by extension or retraction of the master cylinder assembly for trimming the header about the harvester fore-and-aft axis differently than the frame leveling angle achieved by the leveling means, and b) enabling angling of the header at an angle greater than a maximum frame leveling angle achievable by the leveling means.

The combine harvester leveling system aspect of the invention comprises:

leveling means for raising and lowering the rotatable members in opposing direction relative to the main frame to transversely angle the frame toward a level position upon the harvester engaging a hillside, the leveling means comprising a pair of adjusting hydraulic cylinder assemblies having respective opposing first and second ends, the first end of each adjusting assembly being operatively coupled relative to the main frame, the second end of each adjusting hydraulic cylinder assembly being operatively coupled relative to a respective one of the opposing rotatable members for moving the mobile main frame and opposing rotatable members toward and away from one another;

a taut line extending between and operatively coupled relative to the adjusting hydraulic cylinder assembly second ends for movement therewith;

a reference pulley rotatably mounted relative to the main frame, the line operably reeving about the reference pulley, the reference pulley being mounted for movement within a range of movement, the pulley being biased toward movement in one direction within the range of movement which restricts formation of slack within the line;

displacement sensing means for detecting an initial reference location of the reference pulley within the range of movement and for detecting movement of the reference pulley from the reference location; and compensation means responsive to the displacement sensing means detecting movement of the reference pulley from the reference location for adjusting an affected one of the pair of adjusting hydraulic cylinder assemblies to move the reference pulley back to the reference location.

The vehicle chain drive system aspect of the invention comprises:

a first arm having opposing input and output drive ends, an input drive chain sprocket and associated input drive shaft rotatably mounted adjacent the first arm input drive end;

a second arm having opposing input and output drive ends, an output drive chain sprocket and associated output drive shaft rotatably mounted adjacent the second arm output drive end;

a pivot interconnection pivotally interconnecting the first arm and second arm at the first arm output drive end and second arm input drive end, the pivot interconnection enabling pivoting movement of at least the second arm relative to the first arm;

an interconnecting chain drive sprocket assembly independently rotatably supported relative to the pivot interconnection, the chain drive sprocket assembly having a first chain sprocket in driving alignment with the first arm input chain drive sprocket and a rotatably interconnected second chain sprocket in driving alignment with the second arm output chain drive sprocket;

a first endless loop chain received about the first arm input drive chain sprocket and drive sprocket assembly first chain sprocket; and a second endless loop chain received about the second arm output drive chain sprocket and drive sprocket assembly second chain sprocket.

Although developed for a hillside combine, the chain drive aspect of the invention will have applicability in other ground traversing vehicles.

The discussion proceeds first with reference to FIGS. 1–5 showing hillside leveling system combine harvester components in accordance with the invention. FIGS. 1 and 2 illustrate a combine harvester 10 lying over a horizontally level ground surface 12. FIGS. 3, 4, and 5 show combine harvester 10 transversely engaging a hillside ground surface 12a having an angle $\Theta$ relative to horizontal. The figures diagrammatically show a mobile mainframe 14 and pair of transversely opposing rotatable members (wheels) 16 and 18 supported relative to mainframe 14 for moving the harvester over ground surface 12, 12a. Mainframe 14 would mount the operator cab and threshing components (not shown), and desirably maintain a horizontal attitude as the harvester travels across varying transversely sloped terrain. Four such wheels would typically be provided for moving the header over the ground, and be enabled for synchronized opposing raising and lowering movement relative to the mainframe for maintaining the entirety of the frame level. The discussion, however, proceeds with reference to only the one fore pair of transversely opposing wheels.

A conventional drive axle system 20 is shown diagrammatically extending downwardly from mainframe 14 for drivingly engaging wheels 16 and 18, as will be more fully described below. Although not shown in FIGS. 1–5, a transversely extending crop harvesting header would extend forwardly of and be operatively coupled to mainframe 14 for pivoting relative thereto about a generally fore and aft axis of the harvester. Referring briefly to FIGS. 10 and 11, such a header is indicated generally by reference numeral 22. Leveling means are provided for raising and lowering rotatable members 16 and 18 in opposing direction relative to mainframe 14 to transversely angle frame 14 toward a level position upon the harvester engaging a hillside, such as shown in FIG. 3. Corresponding means are provided which effectively cause header 22 to substantially follow the ground contour in a synchronized manner with respect to raising and lower of rotatable members 16 and 18. One preferred embodiment for causing such header movement is described in detail below.

In the illustrated and preferred embodiment, the leveling means comprises a pair of adjusting hydraulic cylinder assemblies 24 and 26, having opposing first and second ends 30 and 32, respectively. First end 30 is comprised of a hydraulic cylinder, while second end 32 is comprised of an associated hydraulic piston rod drivingly received within the cylinder. First end 30 of each adjusting assembly is operatively coupled relative to mainframe 10 by and about a pivoting connection 28. Second end 32 of each adjusting assembly operatively couples relative to a respective one of opposing rotatable members 16, 18. Thusly, mobile mainframe 14 and opposing rotatable members 16, 18 are movable towards and away from one another.

Figure 8B:
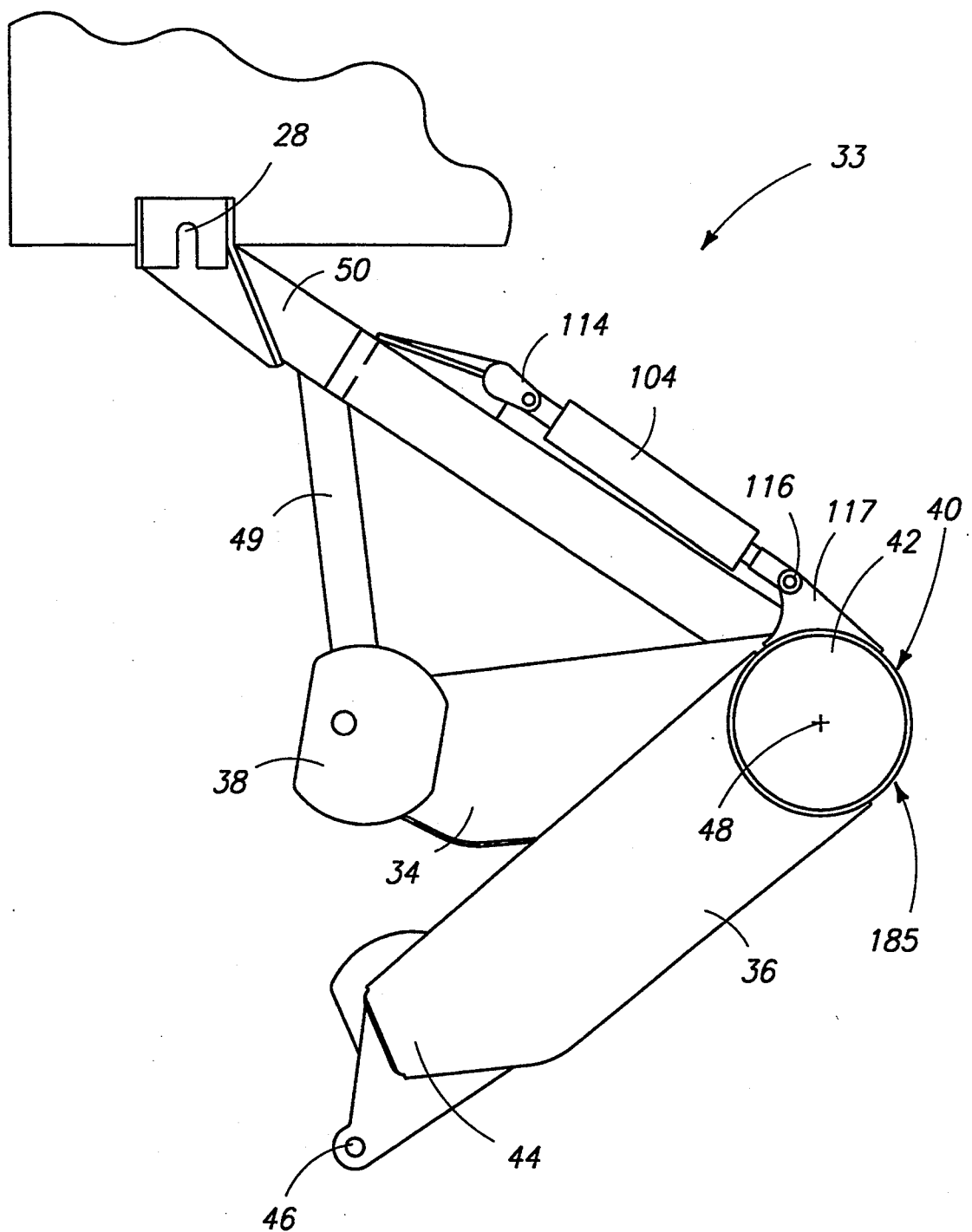
FIG. 8 is a view of the FIG. 7 construction, but shown in an alternate maximum operating configuration.

More particularly, each of wheels 16 and 18 is supported by a pivoting chain drive system 33, shown with clarity in FIGS. 2, 4, 5, 7 and 8. Interconnecting details of construction of chain drive system 33 are not shown in FIGS. 1 and 3 for clarity in those figures. FIG. 7 is an enlargement of FIG. 5, while FIG. 8 shows the FIG. 7 construction in an opposing extreme operating position. Chain drive system 33 includes first and second arms 34 and 36, respectively. First arm 34 has an input drive end 38 and an output drive end 40. Second arm 36 has an input drive end 42 and an output drive end 44. A chain-driving force is transmitted along and through arms 34 and 36 for driving wheels 16 and 18 in a manner which will be described more fully below. For purposes of the immediate discussion, a pivot interconnection 185 pivotally interconnects first arm 34 and second arm 36 at first arm output drive end 40 and second arm input drive end 42. Such enables pivoting movement of second arm 36 relative to first arm 34 about a pivot axis 48. First arm 34 is supported at its input drive end 38 by driving axle 20 and a support arm 49, and at its output drive end 40 via an angled support arm 50. Support arm 49 depends downwardly from support arm 50. Support arms 49 and 50 are not shown in FIGS. 1 and 3 for clarity in those views. FIG. 6 is provided to better illustrate such arms.

First ends 30 of hydraulic assemblies 24 and 26 pivotally connect relative to main frame 14 by connecting with support arms 50 at defined pivot connections 28. Second piston rod ends 32 of hydraulic cylinder assemblies 24 and 26 pivotally connect at locations 46 adjacent output drive ends 44 of second arms 36. Extension or retraction of cylinder assemblies 24 and 26 causes the pivoting of second arm 36 about pivot axis 48, and results in raising and lower of wheels 16 and 18 relative to mobile frame 10. Hydraulic cylinder assemblies 24 and 26 would be acted upon to raise and lower the respective wheels 16 and 18 in a synchronized, opposing and equal manner via a leveling system to maintain mainframe 10 horizontally level within the leveling capability of the machine. A hydraulic system for extending and retracting hydraulic cylinder assemblies 24 and 26 in such manner is described in more detail below.

Prior art hillside leveling combines typically have a mechanically interlinking walking beam which connects between the opposing wheel arms to assure that the raising and lowering of the transverse wheels are equally matched. In accordance with one aspect of this invention, a system is enabled whereby an interconnecting walking beam and its associated weight can be eliminated. Yet without a mechanically interlinking walking beam, some sort of control is desirable to assure that operational aspects of the system do not result in an offsetting of the extension and retraction of cylinder assemblies 24 and 26 relative to mainframe 14. For example, leakage of hydraulic fluid from one adjusting cylinder to the other might undesirably cause creeping of frame 14 and correspondingly axle 20 towards or away from ground surface 12, 12a. The leveling system in such event would still tend to compensate for hillside angling until a point was undesirably reached where no more hydraulic cylinder throw was available. In such event, no more angling of the mainframe 10 relative to the hillside to maintain horizontal would be possible, resulting in less than designed leveling capability. The machine would most likely have to be stopped on level ground, neutrally restored back to its starting configuration.

In accordance with one aspect of the invention, a leveling system to effectively prevent such from happening is provided. Such is described with reference to FIGS. 1–5. Specifically, a taut line 52 extends between and operably couples relative to adjusting hydraulic cylinder assembly second ends 32 for movement therewith. Line 52 preferably comprises a steel cable and connects with outer end 44 of second arm 36, thus effectively coupling with cylinder assembly second ends 32. Cable 52 is reeved about a series of pulleys 53, 54, 55, 56 and 58 which rotatably mount relative to mainframe 14 for movement therewith.

One of such pulleys 55 constitutes a reference pulley mounted for generally vertically sliding movement within a range of movement 59. Reference pulley 55 is biased toward movement in the upward direction within range of movement 59 to restrict formation of any slack within cable line 52. Such bias is illustrated as being provided by means of a weight 60 interconnected to the upper part of the housing of reference pulley 55 via a cable 62 and associated pulleys 63. A switch 64 mechanically links with reference pulley 55 by a switch arm 65.

Pulley 55 is shown as being in an initial reference location, which remains unchanged between FIGS. 1 and 3, within range of movement 59. Switch 64 is activated through switch arm 65 by movement of reference pulley 55 up or down from the illustrated reference location. Switch 64 constitutes a single-pole, double-throw switch activated in one throw by movement of reference pulley 55 from the reference location in the upward direction, and activated in the other throw by movement of reference pulley from the reference location in the downward direction. Switch 64 would activate a hydraulic valve (not shown in FIGS. 1–5) in one of two manners dependent upon the direction of switch throw.

Operation of the system will best be understood by reference to FIGS. 1 and 3. In FIG. 3, as wheel 18 rises and wheel 16 correspondingly lowers due to leveling action, cable 52 is caused to move from right to left over the associated pulleys 53, 54, 55, 56 and 58, as shown. Corresponding lowering movement of wheel 18 and raising movement of 16 would of course cause cable 52 to move from left to right over the same pulleys. Assuming equal raising and lowering of wheels 16 and 18, and the same relative positioning of axle assembly 20 relative to grade 12, 12a, reference pulley 55 stays positionally stationary within vertical range of movement 59.

However if, for example, leakage from one of cylinder assemblies 24, 26 were to cause retraction of its length, the leveling system would correspondingly automatically act to impart fluid flow to or from the other adjusting hydraulic cylinder to maintain a level orientation of mainframe 14. The overall effect, however, would be to ultimately impart equalling movement of wheels 16 and 18 in one direction or the other relative to cylinder assemblies 24 and 26. This action would thereby cause reference pulley 55 to move from its initial reference location of FIGS. 1 and 3 either upward or downward dependent upon the operational characteristic causing an imbalance in the affected cylinder. Such movement of pulley 55 cause switch 64 through switch arm 65 to move in one direction or the other providing a direct indication of which direction from normal the pistons within cylinder assemblies 24 and 26 had undesirably moved. The switch would activate a hydraulic valve (not shown in FIGS. 1-5) by the dependent throw of the switch to impart hydraulic fluid flow relative to one of the adjusting cylinders 26 or 28 to restore reference pulley 55 back to its neutral reference position, as shown in FIGS. 1 and 3. During such activation, the leveling system would also cooperatively self-operate to achieve or maintain leveling of mainframe 14 within the operating leveling limits of the machine while restoring reference pulley 55 back to its reference location.

The above-described mechanical switch and hydraulic valve constitute but one possible example of a, a) displacement sensing means for detecting an initial reference location of the reference pulley within the range of movement and for detecting movement of the reference pulley from that reference location, and b) compensation means responsive to the displacement-sensing means detecting movement of the reference pulley from that reference location for adjusting an effected one of the pair of adjusting hydraulic cylinder assemblies to move the reference pulley back to the reference location. Other means might also of course by utilized and adjust both cylinders simultaneously. By way of example only, such might include optical or electronic switches. Further, microprocessor control might be utilized for both determining any particular desired initial reference location of a reference pulley, and movement of that pulley therefrom, for imparting hydraulic compensating action to restore the pulley to the initial location.

An example hydraulic system for the above-described cylinder assemblies 24, 26 is shown and described with reference to FIG. 9. Such constitutes a hydraulic reservoir 66 and a hydraulic pump 68. A pump case drain line 69 extends back from pump 68 to tank 66. A return line 70, branch feed line R1 and associated relief valve 71 are provided from pump 68 back to tank 66. Filters 73 are provided in line 70. Pump 68 also feeds a series of pilot lines 72 to provide activating force for operating various valves.

Two principal valves 74 and 76 provide operational control of adjusting cylinder assemblies 24 and 26. Valve 74 constitutes the cross leveling control valve. Its operation would be directed by a conventional leveling switch, such as a mercury float switch (not shown), for opposingly extending and retracting cylinder assemblies 26 and 28 as the combine transversely encounters hillside terrain. Vertical height adjusting valve 76 would be operably engaged for directing fluid flow in one of two manners as directed by the FIGS. 1 and 3 switch 64.

A main pressure line 78 feeds from pump 68 to valves 74 and 76. Line 78 includes a branch 144 for operation of a header adjusting system, as is described below. Line 78 branches into a line 80 for feeding to the grade height control valve 76 and into a line 82 feeding cross-leveling valve 74. Line 82 further branches into lines 83 and 84. A pressure-compensated flow control valve 86 is provided in line 84 for comparatively slow speed opposing leveling adjustment of cylinder assemblies 24 and 26. Flow control valve 86 effectively provides hydraulic fluid flow reduction. A high speed valve 88 in line 83, as selected by the operator, would enable higher speed leveling adjustment with cylinder assemblies 24 and 26. Cross-leveling valve 74 feeds a pair of lines 94 and 96 which extend to the opposing cylinder assemblies 24 and 26 for opposingly extending and retracting such cylinder assemblies. Retention valves 90 and 92 prevent hydraulic fluid from escaping from the piston rod ends of cylinder assemblies 24 and 26 if pump 68 fails or is not operating.

Vertical height or grade adjusting valve 76 would be operable in one of two directions depending upon the throw of switch 64. Such provides fluid flow through illustrated line 98 to move the associated piston rods of assemblies 24 and 26 downwardly, or via line 100 to activate check valves 101, 102, and 103 to cause such piston rods to be raised.

The discussion now proceeds with reference to FIGS. 2, 4, 5, 7, 8 and 10-12 for description of a combine harvester header adjusting system in accordance with an aspect of the invention. Transverse header 22 (FIGS. 10 and 11) would include a series of rotating cutting elements (not shown) which would cut crop and centrally feed it in the direction of a rectangular header opening 108. Header 22 is pivotally supported about a central cylindrical, forwardly extending component 110 having a correspondingly sized and shaped opening 112 (FIG. 11) for feeding harvested material from header assembly 22 to harvester main body 14.

The header leveling system comprises a master hydraulic cylinder assembly 104 (FIGS. 2, 4, 5, 7, 8) and a slave hydraulic cylinder assembly 106 (FIGS. 10 and 11). Master hydraulic cylinder assembly 104 has opposing first and second ends 114 and 116. First end 114 is operatively connected relative to main combine frame 14 via connecting support arm 50. Second piston rod end 116 is operatively connected to an extension tang 117 extending from input drive end 42 of second arm 36. Such a configuration will cause extension of master hydraulic cylinder assembly 104 upon upward pivoting of second arm 36 about pivot axis 48, and retraction thereof upon downward pivoting. Accordingly, master hydraulic cylinder assembly 104 is mounted to be operable or slaved from such movement as directed by the leveling means which imparts movement to second arm 36.

Slave hydraulic cylinder assembly 106 has opposing first and second ends 118 and 120, respectively. First end 118 is operably connected relative to main combine frame 14 via a connection on tubular extension 110. Second end 120 is operatively connected relative to the header to cause pivoting of header assembly 22 about the generally fore and aft axis of harvester 10.

Figure 12:
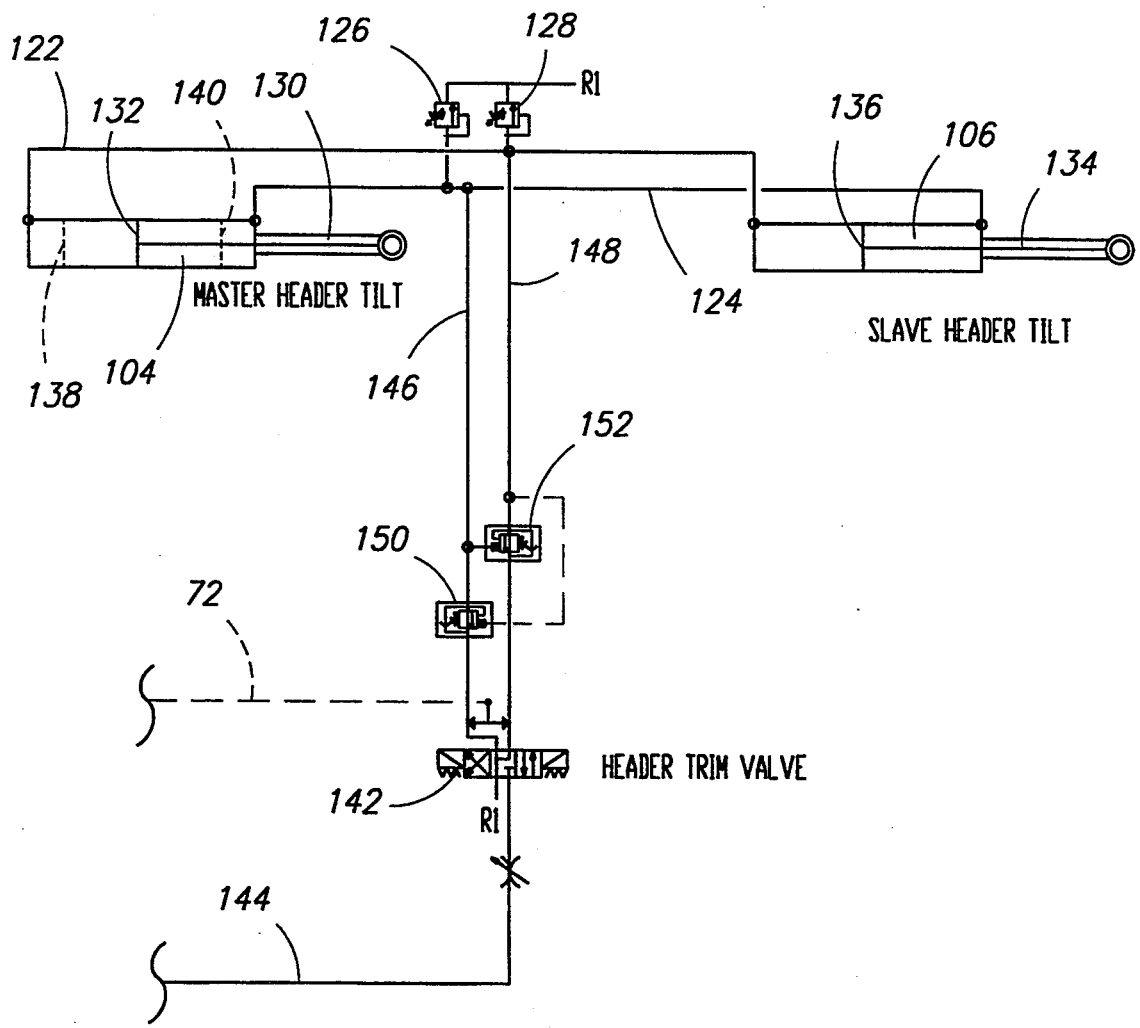
FIG. 12 is a schematic of the hydraulics of a header adjusting system in accordance with the invention.

Reference is now additionally made to FIG. 12 with respect to the cooperative operation of the master hydraulic cylinder assembly and slave hydraulic cylinder assembly. Generally, a pair of hydraulic lines connect selected respective ends of the master and slave cylinder assemblies to impart synchronized slaved extension or retraction of the slave cylinder assembly upon corresponding one of extension or retraction of master cylinder assembly as directed by the leveling means. Thus, synchronized pivoting of the header upon corresponding raising or lowering of one of the rotatable members is hydraulically imparted. It is anticipated that only one master hydraulic cylinder assembly would be associated with any one of the four-wheel drives. Control means are preferably provided for, a) providing more hydraulic fluid to a selected one side of the slave cylinder assembly than is provided by extension or retraction of the master cylinder assembly for trimming the header about the harvester for/and/aft axis differently than the frame leveling angle achieved by the leveling means, and b) enabling angling of the header at an angle greater than a maximum frame level angle achieved by the leveling means.

More specifically with reference to FIG. 14, the leveling system is shown in a neutral or centered trim condition. Master hydraulic cylinder assembly 104 and slave hydraulic cylinder assembly 106 are interconnected by a pair of hydraulic lines 122 and 124. Pressure relief valves 126 and 128 are associated therewith. Master cylinder assembly 104 has a piston rod 130 and a piston 132, while slave hydraulic cylinder assembly has a piston rod 134 and piston 136.

Piston rod 130 of master hydraulic cylinder assembly 104 is extendable or retractable between opposing master extreme positions 138 and 140 determined by the available rod throw as depicted in FIGS. 7 and 8. Master hydraulic cylinder assembly 104 and slave hydraulic cylinder assembly 106 would typically and preferably be constructed of the same size and hydraulic volume. The construction would provide that piston 132 of master assembly 104 is not provided against the stops of its associated cylinder by either full extension or retraction of piston rod 130 by the extreme movements of FIGS. 7 and 8. Thus, slave cylinder assembly 106 will have a hydraulic length which provides or enables slave extreme positions beyond positions 138 and 140 which are reachable by master cylinder assembly extreme extension and extreme retraction alone. Such slave extreme positions will effectively be defined by piston 136 extreme movement fully left or fully right against the cylinder ends. This enables greater slave cylinder throw for either trimming header assembly 22 and/or ultimately angling the header assembly at an angle which is greater than a maximum frame leveling angle which is achievable by the leveling means.

Specifically, an operator-controlled header trim valve 142 is provided. Such is fed via hydraulic branch line 144 (FIGS. 9 and 12). Valve 142 enables fluid to be directed to either of selected sides of master cylinder assembly 104 and slave cylinder assembly 106 to trim or otherwise rotate header assembly 22 slightly differently than the angling achieved by the leveling means of the combine harvester. A pair of lines 146 and 148 interconnect with lines 122 and 124. Valves 150 and 152 are associated respectively with lines 146 and 148 such that the selected trim position is maintained even when hydraulic pump 68 fails or is not operating. Hydraulic fluid provided under pressure through either of lines 146 or 148, under a path of least resistance, will cause extension or retraction of the slave hydraulic cylinder assembly 106 beyond that directed by master cylinder 104 as acted upon by the levelling means. Accordingly, header assembly 22 can be trimmed in various positions regardless of the automated levelling system, as diagrammatically shown in FIG. 12.

Thus in the preferred embodiment, an operator can trim or move transverse header assembly 22 ahead of the wheels to maintain a parallel or non-interfering attitude of the header relative to the terrain prior to the leveling system sensing a non-level condition rearwardly back of the header at the wheels. The preferred construction also enables further angling of the header into the hillside in the event the maximum angle hillside is achieved due to leveling of the cab.

Reference is now made to FIG. 13 for more detailed description of a chain drive system usable with the combine harvester in accordance with another aspect of this invention. Such more fully illustrates first and second arms 34 and 36. Each arm would be constructed to be substantially hollow to retain lubricating oil for bearings and chains therewithin. More specifically, first arm 34 has an input drive chain sprocket 160 and associated input drive shaft 162 rotatably mounted adjacent first arm input drive end 38. Such is supported for rotation by a pair of opposing roller bearing assemblies 164. A sealing backing access plate 166 bolts to the outer side of first arm 36 as shown.

In like manner, second arm 136 includes an output drive chain sprocket 168 and associated output drive shaft 170 rotatably mounted adjacent second arm output drive end 44. A pair of roller bearings 172 rotatably supports sprocket shaft 170. An access plate 174 is bolted internally to second arm 36.

First arm 34 and second arm 36 define a pivot interconnection 185 to enable pivoting about pivot axis 48. Interconnection 185 comprises a roller ball bearing assembly 178 having an inner race 180 and an outer race 182. Inner race 180 fixedly adheres to first arm 34, while outer race 182 fixedly adheres to second arm 36. An annular ring 184 is provided internally about inner race 180 to restrict free How of lubricating oil between first arm 34 and second arm 36. A central void 186 is provided internally of inner race 180 between first arm 34 and second arm 36.

An interconnecting chain drive sprocket assembly 188 is provided between first arm 34 and second arm 36. Such comprises a rotatable shaft 190 having opposing end projections 192 and 194. A first chain sprocket 196 is provided about shaft 190 adjacent end. 194 and is in driving alignment with first arm input drive chain sprocket 160. A second chain sprocket 198 is provided about shaft 190 adjacent end 192 and is in driving alignment with second arm output chain drive sprocket 168. The farthest shaft extensions from shaft 190 outward of sprockets 196 and 198 constitute bearing portions which are rotatably received by a pair of roller bearings 200. As shown, pivot axis 48 and the longitudinal axis of rotation of shaft 190 are coincident. The illustrated construction enables chain drive to be transferred in a vehicle relative to a pair of arms, at least one of which pivots relative to the other.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. For a leveling hillside combine harvester having, a) a mobile main frame, b) a pair of transversely opposing rotatable members supported relative to the main frame for moving the harvester over the ground, c) leveling means for raising and lowering the rotatable members in opposing direction relative to the main frame to transversely angle the frame toward a level position upon the harvester engaging a hillside, d) a transversely extending crop harvesting header operatively coupled to the main frame for pivoting relative thereto about a generally fore-and-aft axis of the harvester; a combine harvester header adjusting system comprising:

a master hydraulic cylinder assembly having opposing ends, one of the master opposing ends being operatively connected relative to the main combine frame, the other of the master opposing ends being operatively connected relative to at least one of the elevationally movable opposing rotatable members to cause extension of the master cylinder assembly upon one of raising or lowering of the one rotatable member relative to the main frame and to cause retraction of the master cylinder assembly upon the other of raising or lowering of the one rotatable member relative to the main frame, the master cylinder assembly being slaved to such extension and retraction movement as directed by the leveling means, the master cylinder assembly being extendable and retractable between opposing master extreme positions;

a slave hydraulic cylinder assembly having opposing ends, one of the slave opposing ends being operatively connected relative to the main combine frame, the other of the slave opposing ends being operatively connected relative to the header to cause pivoting of the header about the generally fore-and-aft axis of the harvester, the slave cylinder assembly being extendable and retractable between opposing slave extreme positions;

a pair of hydraulic lines connecting selected respective ends of the master and slave cylinder assemblies to impart synchronized slaved extension or retraction of the slave cylinder assembly upon corresponding extension or retraction of the master cylinder assembly as directed by the leveling means thus hydraulically imparting synchronized pivoting of the header upon corresponding raising or lowering of the one rotatable member, the slave cylinder assembly having a hydraulic length which provides the slave extreme positions beyond positions which are reachable by master cylinder assembly extreme extension and extreme retraction alone; and control means for, a) providing more hydraulic fluid to a selected one side of the slave cylinder assembly than is provided by extension or retraction of the master cylinder assembly for trimming the header about the harvester fore-and-aft axis differently than the frame leveling angle achieved by the leveling means, and b) enabling angling of the header at an angle greater than a maximum frame leveling angle achievable by the leveling means.

2. The combine harvester header adjusting system of claim 1 wherein the slave and master hydraulic cylinder assemblies are equally proportioned.

3. For a hillside levelling combine harvester having, a) a mobile main frame, b) a pair of transversely opposing rotatable members supported relative to the main frame for moving the harvester over the ground, c) a transversely extending crop harvesting header operatively coupled to the main frame for pivoting relative thereto about a generally fore-and-aft axis of the harvester; a combine harvester leveling system comprising:

leveling means for raising and lowering the rotatable members in opposing direction relative to the main frame to transversely angle the frame toward a level position upon the harvester engaging a hillside, the leveling means comprising a pair of adjusting hydraulic cylinder assemblies having respective opposing first and second ends, the first end of each adjusting assembly being operatively coupled relative to the main frame, the second end of each adjusting hydraulic cylinder assembly being operatively coupled relative to a respective one of the opposing rotatable members for moving the mobile main frame and opposing rotatable members toward and away from one another;

a taut line extending between and operatively coupled relative to the adjusting hydraulic cylinder assembly second ends for movement therewith;

a reference pulley rotatably mounted relative to the main frame, the line operably reeving about the reference pulley, the reference pulley being mounted for movement within a range of movement, the pulley being biased toward movement in one direction within the range of movement which restricts formation of slack within the line;

displacement sensing means for detecting an initial reference location of the reference pulley within the range of movement and for detecting movement of the reference pulley from the reference location; and compensation means responsive to the displacement sensing means detecting movement of the reference pulley from the reference location for adjusting an affected one of the pair of adjusting hydraulic cylinder assemblies to move the reference pulley back to the reference location.

4. The combine harvester leveling system of claim 3 wherein the reference pulley is mounted relative to the main frame for generally vertical movement relative thereto.

5. The combine harvester leveling system of claim 3 wherein the reference pulley is mounted relative to the main frame for generally vertical movement relative thereto, and wherein the reference pulley is biased in the upward direction.

6. The combine harvester leveling system of claim 3 wherein the displacement sensing means comprises a switch activated by movement of the reference pulley from the reference location.

7. The combine harvester leveling system of claim 3 wherein the displacement sensing means and compensation means comprise:

a switch activated by movement of the reference pulley from the reference location, and a hydraulic valve activated by activation of the switch.

8. The combine harvester leveling system of claim 3 wherein the displacement sensing means and compensation means comprise:

a single-pole, double-throw switch activated in one throw by movement of the reference pulley from the reference location in one direction and activated in the other throw by movement of the reference pulley from the reference location in the other direction; and a hydraulic valve activatable by the one throw to impart hydraulic fluid flow relative to one of the adjusting cylinders and activatable by the other throw to impart fluid flow to the other of the adjusting cylinders.

9. A vehicle chain drive system comprising:
a first arm having opposing input and output drive ends, an input drive chain sprocket and associated input drive shaft rotatably mounted adjacent the first arm input drive end;
a second arm having opposing input and output drive ends, an output drive chain sprocket and associated output drive shaft rotatably mounted adjacent the second arm output drive end;
a pivot interconnection pivotally interconnecting the first arm and second arm at the first arm output drive end and second arm input drive end, the pivot interconnection enabling pivoting movement of at least the second arm relative to the first arm;
an interconnecting chain drive sprocket assembly independently rotatably supported relative to the pivot interconnection, the chain drive sprocket assembly having a first chain sprocket in driving alignment with the first arm input chain drive sprocket and a rotatably interconnected second chain sprocket in driving alignment with the second arm output chain drive sprocket;
a first endless loop chain received about the first arm input drive chain sprocket and drive sprocket assembly first chain sprocket; and
a second endless loop chain received about the second arm output drive chain sprocket and drive sprocket assembly second chain sprocket.

10. The vehicle chain drive system of claim 9 wherein the pivoting movement occurs about a pivot axis and the interconnecting chain drive sprocket assembly rotates about an axis of rotation, the pivot axis and axis or rotation being coincident.

11. The vehicle chain drive system of claim 9 wherein the pivot interconnection comprises a pivot roller bearing having inner and outer races, the inner race being secured to one of first or second arms, the outer race being secured to the other of the first or second arms.

12. The vehicle chain drive system of claim 9 wherein,
the pivot interconnection comprises a pivot roller bearing having inner and outer races, the inner race being secured to one of first or second arms, the outer race being secured to the other of the first or second arms; and
the pivot roller bearing being provided about the interconnecting chain drive sprocket assembly, with the interconnecting chain drive sprocket assembly freely extending through an internal void created by the inner race.

13. The vehicle chain drive system of claim 9 wherein the interconnecting chain drive sprocket assembly comprises a rotatable shaft assembly about which the first and second chain sprockets are received, the rotatable shaft assembly having opposing ends, the first chain sprocket being received adjacent one of the shaft assembly ends, the second chain sprocket being received adjacent the other of the shaft assembly ends, the rotatable shaft assembly having opposing bearing portions extending longitudinally beyond where the first and second chain sprockets are received relative to the shaft assembly, the opposing bearing portions being rotatably received by a pair of roller bearings.

14. The vehicle chain drive system of claim 9 wherein,
the pivot interconnection comprises a pivot roller bearing having inner and outer races, the inner race being secured to one of first or second arms, the outer race being secured to the other of the first or second arms;
the pivot roller bearing being provided about the interconnecting chain drive sprocket assembly, with the interconnecting chain drive sprocket assembly freely extending through an internal void created by the inner race; and
the interconnecting chain drive sprocket assembly comprises a rotatable shaft assembly about which the first and second chain sprockets are received, the rotatable shaft assembly having opposing ends, the first chain sprocket being received adjacent one of the shaft assembly ends, the second chain sprocket being received adjacent the other of the shaft assembly ends, the rotatable shaft assembly having opposing bearing portions extending longitudinally beyond where the first and second chain sprockets are received relative to the shaft assembly, the opposing bearing portions being rotatably received by a pair of roller bearings.

15. For a hillside levelling combine harvester having, a) a mobile main frame, b) a pair of transversely opposing rotatable members supported relative to the main frame for moving the harvester over the ground, c) a transversely extending crop harvesting header operatively coupled to the main frame for pivoting relative thereto about a generally fore-and-aft axis of the harvester; a hydraulic combine harvester leveling system and hydraulic header adjusting system comprising, said systems being operable through a single hydraulic system, the hydraulic combine harvester leveling system comprising:
leveling means for raising and lowering the rotatable members in opposing direction relative to the main frame to transversely angle the frame toward a level position upon the harvester engaging a hillside, the leveling means comprising a pair of adjusting hydraulic cylinder assemblies having respective opposing first and second ends, the first end of each adjusting assembly being operatively coupled relative to the main frame, the second end of each adjusting hydraulic cylinder assembly being operatively coupled relative to a respective one of the opposing rotatable members for moving the mobile main frame and opposing rotatable members toward and away from one another;
a taut line extending between and operatively coupled relative to the adjusting hydraulic cylinder assembly second ends for movement therewith;
a reference pulley rotatably mounted relative to the main frame, the line operably reeving about the reference pulley, the reference pulley being mounted for movement within a range of movement, the pulley being biased toward movement in one direction within the range of movement which restricts formation of slack within the line;
displacement sensing means for detecting an initial reference location of the reference pulley within the range of movement and for detecting movement of the reference pulley from the reference location; and
compensation means responsive to the displacement sensing means detecting movement of the reference pulley from the reference location for adjusting an affected one of the pair of adjusting hydraulic cylinder assemblies to move the reference pulley back to the reference location; and the combine harvester header adjusting system comprising:
a master hydraulic cylinder assembly having opposing ends, one of the master opposing ends being operatively connected relative to the main combine frame, the other of the master opposing ends being operatively connected relative to at least one of the elevationally movable opposing rotatable members to cause extension of the master cylinder assembly upon one of raising or lowering of the one rotatable member relative to the main frame and to cause retraction of the master cylinder assembly upon the other of raising or lowering of the one rotatable member relative to the main frame, the master cylinder assembly being slaved to such extension and retraction movement as directed by the leveling means, the master cylinder assembly being extendable and retractable between opposing master extreme positions;
a slave hydraulic cylinder assembly having opposing ends, one of the slave opposing ends being operatively connected relative to the main combine frame, the other of the slave opposing ends being operatively connected relative to the header to cause pivoting of the header about the generally fore-and-aft axis of the harvester, the slave cylinder assembly being extendable and retractable between opposing slave extreme positions;
a pair of hydraulic lines connecting selected respective ends of the master and slave cylinder assemblies to impart synchronized slaved extension or retraction of the slave cylinder assembly upon corresponding extension or retraction of the master cylinder assembly as directed by the leveling means thus hydraulically imparting synchronized pivoting of the header upon corresponding raising or lowering of the one rotatable member, the slave cylinder assembly having a hydraulic length which provides the slave extreme positions beyond positions which are reachable by master cylinder assembly extreme extension and extreme retraction alone; and
control means for, a) providing more hydraulic fluid to a selected one side of the slave cylinder assembly than is provided by extension or retraction of the master cylinder assembly for trimming the header about the harvester fore-and-aft axis differently than the frame leveling angle achieved by the leveling means, and b) enabling angling of the header at an angle greater than a maximum frame leveling angle achievable by the leveling means.

16. The combine harvester leveling system and hydraulic header adjusting system of claim 15 wherein the reference pulley is mounted relative to the main frame for generally vertical movement relative thereto, and wherein the reference pulley is biased in the upward direction.

17. The combine harvester leveling system and hydraulic header adjusting system of claim 15 wherein the displacement sensing means comprises a switch activated by movement of the reference pulley from the reference location.

18. The combine harvester leveling system and hydraulic header adjusting system of claim 15 wherein the displacement sensing means and compensation means comprise:
a switch activated by movement of the reference pulley from the reference location, and a hydraulic valve activated by activation of the switch.

19. The combine harvester leveling system and hydraulic header adjusting system of claim 15 wherein the displacement sensing means and compensation means comprise:
a single-pole, double-throw switch activated in one throw by movement of the reference pulley from the reference location in one direction and activated in the other throw by movement of the reference pulley from the reference location in the other direction; and
a hydraulic valve activatable by the one throw to impart hydraulic fluid flow relative to one of the adjusting cylinders and activatable by the other throw to impart fluid flow to the other of the adjusting cylinders.

20. For a leveling hillside combine harvester having, a) a mobile main frame, b) a pair of transversely opposing rotatable members supported relative to the main frame for moving the harvester over the ground, c) leveling means for raising and lowering the rotatable members in opposing direction relative to the main frame to transversely angle the frame toward a level position upon the harvester engaging a hillside, d) a transversely extending crop harvesting header operatively coupled to the main frame for pivoting relative thereto about a generally fore-and-aft axis of the harvester; a cooperative chain drive system and header adjusting system, the a chain drive system comprising:
a first arm having opposing input and output drive ends, an input drive chain sprocket and associated input drive shaft rotatably mounted adjacent the first arm input drive end;
a second arm having opposing input and output drive ends, an output drive chain sprocket and associated output drive shaft rotatably mounted adjacent the second arm output drive end to rotatably drive one of the rotatable members;
a pivot interconnection pivotally interconnecting the first arm and second arm at the first arm output drive end and second arm input drive end, the pivot interconnection enabling pivoting movement of at least the second arm relative to the first arm;
an interconnecting chain drive sprocket assembly independently rotatably supported relative to the pivot interconnection, the chain drive sprocket assembly having a first chain sprocket in driving alignment with the first arm input chain drive sprocket and a rotatably interconnected second chain sprocket in driving alignment with the second arm output chain drive sprocket;
a first endless loop chain received about the first arm input drive chain sprocket and drive sprocket assembly first chain sprocket; and
a second endless loop chain received about the second arm output drive chain sprocket and drive sprocket assembly second chain sprocket; and a combine harvester header adjusting system comprising:
a master hydraulic cylinder assembly having opposing ends, one of the master opposing ends being operatively connected relative to the main combine frame, the other of the master opposing ends being operatively connected relative to the second arm to cause one of extension or retraction of the master cylinder assembly upon downward pivoting of the second arm relative to the first arm and to cause the other of extension or retraction of the master cylinder assembly upon upward pivoting of the second arm relative to the first arm, the master cylinder assembly being slaved to such extension and retraction movement as directed by the leveling means, the master cylinder assembly being extendable and retractable between opposing master extreme positions;

a slave hydraulic cylinder assembly having opposing ends, one of the slave opposing ends being operatively connected relative to the main combine frame, the other of the slave opposing ends being operatively connected relative to the header to cause pivoting of the header about the generally fore-and-aft axis of the harvester, the slave cylinder assembly being extendable and retractable between opposing slave extreme positions;

a pair of hydraulic lines connecting selected respective ends of the master and slave cylinder assemblies to impart synchronized slaved extension or retraction of the slave cylinder assembly upon corresponding extension or retraction of the master cylinder assembly as directed by the leveling means thus hydraulically imparting synchronized pivoting of the header upon corresponding raising or lowering of the one rotatable member, the slave cylinder assembly having a hydraulic length which provides the slave extreme positions beyond positions which are reachable by master cylinder assembly extreme extension and extreme retraction alone; and control means for, a) providing more hydraulic fluid to a selected one side of the slave cylinder assembly than is provided by extension or retraction of the master cylinder assembly for trimming the header about the harvester fore-and-aft axis differently than the frame leveling angle achieved by the leveling means, and b) enabling angling of the header at an angle greater than a maximum frame leveling angle achievable by the leveling means.

21. The cooperative chain drive system and header adjusting system of claim 20 wherein the pivoting movement occurs about a pivot axis and the interconnecting chain drive sprocket assembly rotates about an axis of rotation, the pivot axis and axis or rotation being coincident.

22. The cooperative chain drive system and header adjusting system of claim 20 wherein, the pivot interconnection comprises a pivot roller bearing having inner and outer races, the inner race being secured to one of first or second arms, the outer race being secured to the other of the first or second arms; and the pivot roller bearing being provided about the interconnecting chain drive sprocket assembly, with the interconnecting chain drive sprocket assembly freely extending through an internal void created by the inner race.

23. For a hillside levelling combine harvester having, a) a mobile main frame, b) a pair of transversely opposing rotatable members supported relative to the main frame for moving the harvester over the ground, c) a transversely extending crop harvesting header operatively coupled to the main frame for pivoting relative thereto about a generally fore-and-aft axis of the harvester; a pair of chain drive systems to rotatingly drive the opposing rotatable members and a cooperative harvester leveling system, each chain drive system comprising:

a first arm having opposing input and output drive ends, an input drive chain sprocket and associated input drive shaft rotatably mounted adjacent the first arm input drive end;

a second arm having opposing input and output drive ends, an output drive chain sprocket and associated output drive shaft rotatably mounted adjacent the second arm output drive end to rotatably drive one of the rotatable members;

a pivot interconnection pivotally interconnecting the first arm and second arm at the first arm output drive end and second arm input drive end, the pivot interconnection enabling pivoting movement of at least the second arm relative to the first arm;

an interconnecting chain drive sprocket assembly independently rotatably supported relative to the pivot interconnection, the chain drive sprocket assembly having a first chain sprocket in driving alignment with the first arm input chain drive sprocket and a rotatably interconnected second chain sprocket in driving alignment with the second arm output chain drive sprocket;

a first endless loop chain received about the first arm input drive chain sprocket and drive sprocket assembly first chain sprocket; and a second endless loop chain received about the second arm output drive chain sprocket and drive sprocket assembly second chain sprocket; and a combine harvester leveling system comprising:

leveling means for raising and lowering the rotatable members in opposing direction relative to the main frame to transversely angle the frame toward a level position upon the harvester engaging a hillside, the leveling means comprising a pair of adjusting hydraulic cylinder assemblies having respective opposing first and second ends, the first end of each adjusting assembly being operatively coupled relative to the main frame, the second end of each adjusting hydraulic cylinder assembly being operatively coupled relative to a respective one of the second arms for moving the mobile main frame and opposing rotatable members toward and away from one another;

a taut line extending between and operatively coupled relative to the adjusting hydraulic cylinder assembly second ends for movement therewith;

a reference pulley rotatably mounted relative to the main frame, the line operably reeving about the reference pulley, the reference pulley being mounted for movement within a range of movement, the pulley being biased toward movement in one direction within the range of movement which restricts formation of slack within the line;

displacement sensing means for detecting an initial reference location of the reference pulley within the range of movement and for detecting movement of the reference pulley from the reference location; and compensation means responsive to the displacement sensing means detecting movement of the reference pulley from the reference location for adjusting an affected one of the pair of adjusting hydraulic cylinder assemblies to move the reference pulley back to the reference location.

24. The pair of chain drive systems and cooperative combine harvester leveling system of claim 23 wherein the reference pulley is mounted relative to the main frame for generally vertical movement relative thereto, and wherein the reference pulley is biased in the upward direction.

25. The pair of chain drive systems and cooperative combine harvester leveling system of claim 23 wherein the displacement sensing means comprises a switch activated by movement of the reference pulley from the reference location.

26. The pair of chain drive systems and cooperative combine harvester leveling system of claim 23 wherein the displacement sensing means and compensation means comprise:
a switch activated by movement of the reference pulley from the reference location, and a hydraulic valve activated by activation of the switch.

27. The pair of chain drive systems and cooperative combine harvester leveling system of claim 23 wherein the displacement sensing means and compensation means comprise:
a single-pole, double-throw switch activated in one throw by movement of the reference pulley from the reference location in one direction and activated in the other throw by movement of the reference pulley from the reference location in the other direction; and
a hydraulic valve activatable by the one throw to impart hydraulic fluid flow relative to one of the adjusting cylinders and activatable by the other throw to impart fluid flow to the other of the adjusting cylinders.

28. The pair of chain drive systems and cooperative combine harvester leveling system of claim 23 wherein the pivoting movement occurs about a pivot axis and the interconnecting chain drive sprocket assembly rotates about an axis of rotation, the pivot axis and axis or rotation being coincident.

29. The pair of chain drive systems and cooperative combine harvester leveling system of claim 23 wherein,
the pivot interconnection comprises a pivot roller bearing having inner and outer races, the inner race being secured to one of first or second arms, the outer race being secured to the other of the first or second arms; and
the pivot roller bearing being provided about the interconnecting chain drive sprocket assembly, with the interconnecting chain drive sprocket assembly freely extending through an internal void created by the inner race.

30. For a hillside levelling combine harvester having, a) a mobile main frame, b) a pair of transversely opposing rotatable members supported relative to the main frame for moving the harvester over the ground, c) a transversely extending crop harvesting header operatively coupled to the main frame for pivoting relative thereto about a generally fore-and-aft axis of the harvester; a pair of chain drive systems to rotatingly drive the opposing rotatable members, each chain drive system comprising:
a first arm having opposing input and output drive ends, an input drive chain sprocket and associated input drive shaft rotatably mounted adjacent the first arm input drive end;
a second arm having opposing input and output drive ends, an output drive chain sprocket and associated output drive shaft rotatably mounted adjacent the second arm output drive end to rotatably drive one of the rotatable members;
a pivot interconnection pivotally interconnecting the first arm and second arm at the first arm output drive end and second arm input drive end, the pivot interconnection enabling pivoting movement of at least the second arm relative to the first arm;
an interconnecting chain drive sprocket assembly independently rotatably supported relative to the pivot interconnection, the chain drive sprocket assembly having a first chain sprocket in driving alignment with the first arm input chain drive sprocket and a rotatably interconnected second chain sprocket in driving alignment with the second arm output chain drive sprocket;
a first endless loop chain received about the first arm input drive chain sprocket and drive sprocket assembly first chain sprocket; and
a second endless loop chain received about the second arm output drive chain sprocket and drive sprocket assembly second chain sprocket; and a combine harvester leveling system comprising:
leveling means for raising and lowering the rotatable members in opposing direction relative to the main frame to transversely angle the frame toward a level position upon the harvester engaging a hillside, the leveling means comprising a pair of adjusting hydraulic cylinder assemblies having respective opposing first and second ends, the first end of each adjusting assembly being operatively coupled relative to the main frame, the second end of each adjusting hydraulic cylinder assembly being operatively coupled relative to a respective one of the second arms for moving the mobile main frame and opposing rotatable members toward and away from one another;
a taut line extending between and operatively coupled relative to the adjusting hydraulic cylinder assembly second ends for movement therewith;
a reference pulley rotatably mounted relative to the main frame, the line operably reeving about the reference pulley, the reference pulley being mounted for movement within a range of movement, the pulley being biased toward movement in one direction within the range of movement which restricts formation of slack within the line;
displacement sensing means for detecting an initial reference location of the reference pulley within the range of movement and for detecting movement of the reference pulley from the reference location; and
compensation means responsive to the displacement sensing means detecting movement of the reference pulley from the reference location for adjusting an affected one of the pair of adjusting hydraulic cylinder assemblies to move the reference pulley back to the reference location; and a combine harvester header adjusting system comprising:
a master hydraulic cylinder assembly having opposing ends, one of the master opposing ends being operatively connected relative to the main combine frame, the other of the master opposing ends being operatively connected relative to the second arm to cause one of extension or retraction of the master cylinder assembly upon downward pivoting of the second arm relative to the first arm and to cause the other of extension or retraction of the master cylinder assembly upon upward pivoting of the second arm relative to the first arm, the master cylinder assembly being slaved to such extension and retraction movement as directed by the leveling means, the master cylinder assembly being extendable and retractable between opposing master extreme positions;

a slave hydraulic cylinder assembly having opposing ends, one of the slave opposing ends being operatively connected relative to the main combine frame, the other of the slave opposing ends being operatively connected relative to the header to cause pivoting of the header about the generally fore-and-aft axis of the harvester, the slave cylinder assembly being extendable and retractable between opposing slave extreme positions;

a pair of hydraulic lines connecting selected respective ends of the master and slave cylinder assemblies to impart synchronized slaved extension or retraction of the slave cylinder assembly upon corresponding extension or retraction of the master cylinder assembly as directed by the leveling means thus hydraulically imparting synchronized pivoting of the header upon corresponding raising or lowering of the one rotatable member, the slave cylinder assembly having a hydraulic length which provides the slave extreme positions beyond positions which are reachable by master cylinder assembly extreme extension and extreme retraction alone; and control means for, a) providing more hydraulic fluid to a selected one side of the slave cylinder assembly than is provided by extension or retraction of the master cylinder assembly for trimming the header about the harvester fore-and-aft axis differently than the frame leveling angle achieved by the leveling means, and b) enabling angling of the header at an angle greater than a maximum frame leveling angle achievable by the leveling means.

31. The apparatus of claim 30 wherein the reference pulley is mounted relative to the main frame for generally vertical movement relative thereto, and wherein the reference pulley is biased in the upward direction.

32. The apparatus of claim 30 wherein the displacement sensing means comprises a switch activated by movement of the reference pulley from the reference location.

33. The apparatus of claim 30 wherein the displacement sensing means and compensation means comprise:
a switch activated by movement of the reference pulley from the reference location, and a hydraulic valve activated by activation of the switch.

34. The apparatus of claim 30 wherein the displacement sensing means and compensation means comprise:
a single-pole, double-throw switch activated in one throw by movement of the reference pulley from the reference location in one direction and activated in the other throw by movement of the reference pulley from the reference location in the other direction; and
a hydraulic valve activatable by the one throw to impart hydraulic fluid flow relative to one of the adjusting cylinders and activatable by the other throw to impart fluid flow to the other of the adjusting cylinders.

35. The apparatus of claim 30 wherein the pivoting movement occurs about a pivot axis and the interconnecting chain drive sprocket assembly rotates about an axis of rotation, the pivot axis and axis or rotation being coincident.

36. The apparatus of claim 30 wherein,
the pivot interconnection comprises a pivot roller bearing having inner and outer races, the inner race being secured to one of first or second arms, the outer race being secured to the other of the first or second arms; and the pivot roller bearing being provided about the interconnecting chain drive sprocket assembly, with the interconnecting chain drive sprocket assembly freely extending through an internal void created by the inner race.

37. For a leveling hillside combine harvester having, a) a mobile main frame, b) a pair of transversely opposing rotatable members supported relative to the main frame for moving the harvester over the ground, c) leveling means for raising and lowering the rotatable members in opposing direction relative to the main frame to transversely angle the frame toward a level position upon the harvester engaging a hillside, d) a transversely extending crop harvesting header operatively coupled to the main frame for pivoting relative thereto about a generally fore-and-aft axis of the harvester; a combine harvester header adjusting system comprising:

a master hydraulic cylinder assembly having opposing ends, one of the master opposing ends being operatively connected relative to the main combine frame, the .other of the master opposing ends being operatively connected relative to at least one of the elevationally movable opposing rotatable members to cause extension of the master cylinder assembly upon one of raising or lowering of the one rotatable member relative to the main frame and to cause retraction of the master cylinder assembly .upon the other of raising or lowering of the one rotatable member relative to the main frame, the master cylinder assembly being slaved to such extension and retraction movement as directed by the leveling means;

a slave hydraulic cylinder assembly having opposing ends, one of the slave opposing ends being operatively connected relative to the main combine frame, the other of the slave opposing ends being operatively connected relative to the header to cause pivoting of the header about the generally fore-and-aft axis of the harvester;

a pair of hydraulic lines connecting selected respective ends of the master and slave cylinder assemblies to impart synchronized slaved extension or retraction of the slave cylinder assembly upon corresponding extension or retraction of the master cylinder assembly as directed by the leveling means thus hydraulically imparting synchronized pivoting of the header upon corresponding raising or lowering of the one rotatable member; and a pair of chain drive systems to rotatingly drive the opposing rotatable members, each chain drive system comprising:
a first arm having opposing input and output drive ends, an input drive chain sprocket and associated input drive shaft rotatably mounted adjacent the first arm input drive end;
a second arm having opposing input and output drive ends, an output drive chain sprocket and associated output drive shaft rotatably mounted adjacent the second arm output drive end to rotatably drive one of the rotatable members;
a pivot interconnection pivotally interconnecting the first arm and second arm at the first arm output drive end and second arm input drive end, the pivot interconnection enabling pivoting movement of at least the second arm relative to the first arm;

an interconnecting chain drive sprocket assembly independently rotatably supported relative to the pivot interconnection, the chain drive sprocket assembly having a first chain sprocket in driving alignment with the first arm input chain drive sprocket and a rotatably interconnected second chain sprocket in driving alignment with the second arm output chain drive sprocket;

a first endless loop chain received about the first arm input drive chain sprocket and drive sprocket assembly first chain sprocket; and a second endless loop chain received about the second arm output drive chain sprocket and drive sprocket assembly second chain sprocket.

38. The apparatus of claim 37 wherein the pivot interconnection comprises a pivot roller bearing having inner and outer races, the inner race being secured to one of first or second arms, the outer race being secured to the other of the first or second arms.

39. The apparatus of claim 37 wherein, the pivot interconnection comprises a pivot roller bearing having inner and outer races, the inner race being secured to one of first or second arms, the outer race being secured to the other of the first or second arms; and the pivot roller bearing being provided about the interconnecting chain drive sprocket assembly, with the interconnecting chain drive sprocket assembly freely extending through an internal void created by the inner race.

40. The apparatus of claim 37 wherein the interconnecting chain drive sprocket assembly comprises a rotatable shaft assembly about which the first and second chain sprockets are received, the rotatable shaft assembly having opposing ends, the first chain sprocket being received adjacent one of the shaft assembly ends, the second chain sprocket being received adjacent the other of the shaft assembly ends, the rotatable shaft assembly having opposing bearing portions extending longitudinally beyond where the first and second chain sprockets are received relative to the shaft assembly, the opposing bearing portions being rotatably received by a pair of roller bearings.

41. The apparatus of claim 37 wherein, the pivot interconnection comprises a pivot roller bearing having inner and outer races, the inner race being secured to one of first or second arms, the outer race being secured to the other of the first or second arms;

the pivot roller bearing being provided about the interconnecting chain drive sprocket assembly, with the interconnecting chain drive sprocket assembly freely extending through an internal void created by the inner race; and the interconnecting chain drive sprocket assembly comprises a rotatable shaft assembly about which the first and second chain sprockets are received, the rotatable shaft assembly having opposing ends, the first chain sprocket being received adjacent one of the shaft assembly ends, the second chain sprocket being received adjacent the other of the shaft assembly ends, the rotatable shaft assembly having opposing bearing portions extending longitudinally beyond where the first and second chain sprockets are received relative to the shaft assembly, the opposing bearing portions being rotatably received by a pair of roller bearings.

* * * * *